Sept. 19, 1950  W. K. SESSIONS, JR., ET AL  2,522,844
COMBINED BUSHING AND ANCHOR FOR ELECTRIC WIRES
Filed July 18, 1947  2 Sheets-Sheet 1
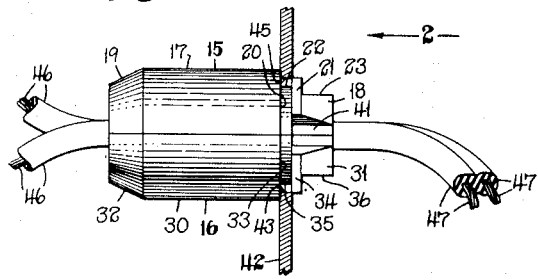
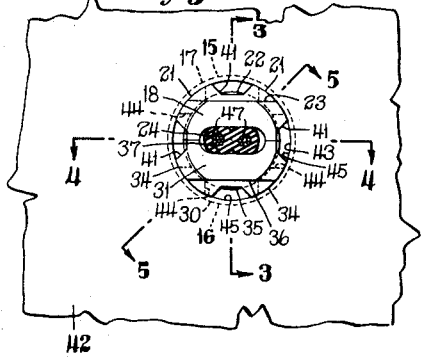
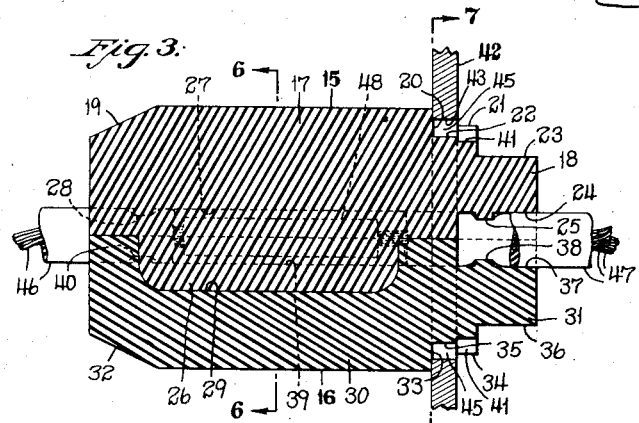
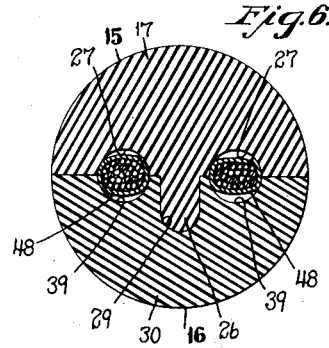
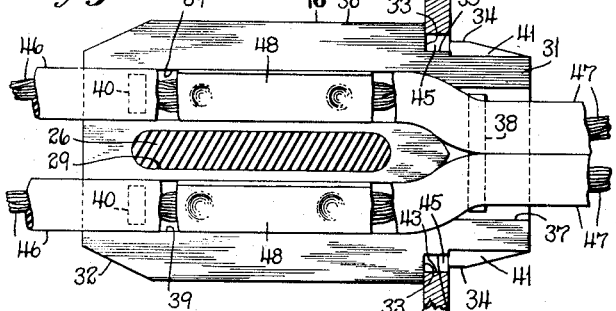
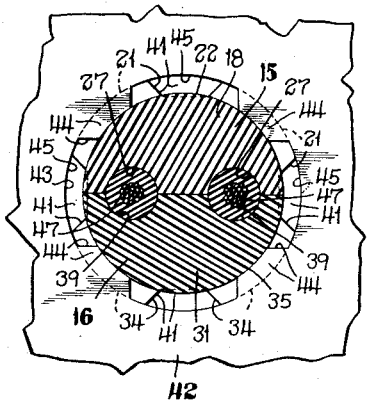
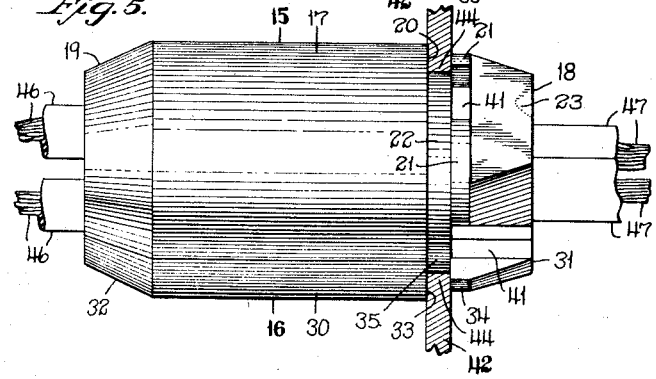
Inventors
William K. Sessions Jr.
Earl D. Brightman
By Seymour, Carl & Nichols
Attorneys Sept. 19, 1950 W. K. SESSIONS, JR., ET AL 2,522,844
COMBINED BUSHING AND ANCHOR FOR ELECTRIC WIRES
Filed July 18, 1947 2 Sheets-Sheet 2
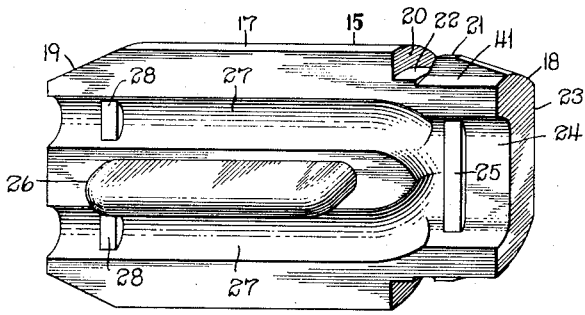
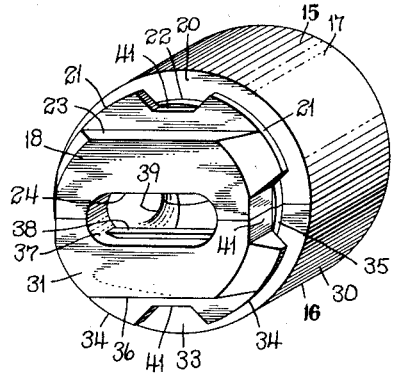
Inventors
William K. Sessions Jr.
Earl D. Brightman
By Seymour, Earle & Nichols
Attorneys Patented Sept. 19, 1950

2,522,844

UNITED STATES PATENT OFFICE 2,522,844

COMBINED BUSHING AND ANCHOR FOR ELECTRIC WIRES

William K. Sessions, Jr., Bristol, and Earl D. Brightman, Forestville, Conn., assignors to The Sessions Clock Co., Forestville, Conn., a corporation of Connecticut Application July 18, 1947, Serial No. 761,796

9 Claims. (Cl. 174—153)

The present invention relates to improvements in combined bushings and anchors for electric wires and is especially well adapted for use in connection with synchronous electric clocks, though its use is not so limited.

In electric clocks in particular, it is necessary to pass electric conductors outwardly through casings in order to provide for the connection of the clock to a source of electric current. The electric wires leading from the clock to a plug or other electrical fitting are adequately heavy but must, in turn, be connected at their inner ends to the relatively-slender and fragile wires which constitute the terminals of the energizing-coils of the small synchronous electric motors employed.

While many so-called strain-reliefs are available on the market, they are open to many objections especially in instances where it is not feasible, due to cramped and limited space, to form a knot in the heavy electric wires in order to prevent their being pulled through the clock cases. Furthermore, the prior strain-reliefs have been expensive to assemble and difficult to disassemble.

One of the main objects of the present invention is to provide a combined bushing and anchor for electric wires which provides both for low cost for manufacture and ease and facility of of assembly and disassembly.

Another object of the present invention is to provide a device of the character referred to which will adequately anchor one or more electric conductors without requiring that the same be knotted.

In the accompanying drawings, in which certain modes of carrying out the present invention are shown for illustrative purposes:

Fig. 1 is a view in side elevation of one form which a combined bushing and anchor for electric wires may assume in accordance with the present invention and also showing in section a fragment of a casing associated therewith;

Fig. 2 is a view of the showing of Fig. 1 looking in the direction of the arrow 2 but showing the pair of electric wires in section;

Fig. 3 is a sectional view taken on the line 3—3 of Fig. 2 but on a larger scale;

Fig. 4 is a horizontal sectional view taken on the line 4—4 of Fig. 2, but on the same scale as Fig. 3;

Fig. 5 is a view partly in section on the line 5—5 of Fig. 2, but showing the combined bushing and anchor in elevation and on the same scale as Figs. 3 and 4;

Fig. 6 is a transverse sectional view taken on the line 6—6 of Fig. 3;

Fig. 7 is a similar view taken on the line 7—7 of Fig. 3;

Fig. 8 is a perspective view of the combined bushing and anchor, but omitting the electric wires;

Fig. 9 is a perspective view of the male-member;

Fig. 10 is a similar view of the complemental female-member;

Fig. 11 is a broken perspective view of the fragment of the casing shown in the preceding figures; and Fig. 12 is a view similar to Fig. 4, but showing the two pairs of wires joined by a simple soldering operation rather than by connecting clips or sleeves.

The particular combined bushing and anchor chosen for illustration in the accompanying drawings for purposes of making clear a preferred form of the present invention, includes a male-member generally designated by the reference character 15 and a complemental female-member generally designated by the reference character 16. Both of the said members are of substantially semicylindrical form and may be conveniently formed of nylon, cellulose-acetate or any other insulating material having the requisite mechanical and dielectric strength.

The male-member 15 above referred to includes a relatively-large body-portion 17, from one end of which projects an integral neck-portion 18. At its end opposite its neck-portion 18, the body-portion 15 has its periphery beveled as at 19, for purposes as will hereinafter appear.

At the junction of its body-portion 17 and its neck-portion 18, the male-member 15 is so shaped as to provide a substantially semiannular stop-shoulder 20 facing outwardly toward the end of the neck-portion 18 and in opposition to the inner face of two (more or less) similar locking-lugs or -abutments 21—21. Both of the said locking-lugs are spaced in an axial direction with respect to the stop-shoulder 20 to provide a substantially semiannular channel 22. The surface of the outer portion of the neck-portion 18 opposite the flat inner face of the male-member 15 is flattened off in parallelism with the said inner face to provide a flat or tool-receiving face 23 which, in conjunction with a similar flat or tool-receiving face on the female-member 16, will provide for the joint turning of the said members in a manner as will hereinafter appear.

Save for the tool-receiving portion 23, the neck-portion 18 is tapered, as shown, to facilitate its entry into an aperture, in a manner as will hereinafter appear.

In the inner flat face of its neck-portion 18, the male-member 15 is formed with a relatively-wide wire-channel 24 across which transversely extends a wire-gripping rib or anchor 25, as is especially well shown in Fig. 9.

Located centrally of its substantially-flat inner face, the male-member 15 is formed with an integral longitudinally-extending coupling-rib or -projection 26 which is adapted to coact with the female-member 16, in a manner as will presently be described.

Molded or otherwise formed in the substantially-flat inner face of the body-portion 17 of the male-member 15 and respectively flanking the coupling-rib 26 are two wire-channels 27—27 intersecting the end of the said body-portion adjacent its bevel 19 and at their opposite ends curved slightly inwardly and merging into the adjacent end of the relatively-wide wire-channel 24 in the neck-portion 18, as is especially well shown in Fig. 9. Extending transversely across each of the wire-channels 27—27 just referred to adjacent the ends thereof remote from the neck-portion 18, is one of two similar wire-gripping ribs or anchors 28—28. The two spaced parallel channels 27—27 and the relatively-wide channel 24 form what is hereinafter referred to as a "Y-shaped" conductor channel, the channels 27—27 being termed "branch" channels and the channel 24 the "trunk" channel.

The female-member 16 is substantially identical to the male-member 15 save that instead of being provided with a coupling-rib such as 26, it is provided substantially centrally of its transverse width in its substantially-flat inner face, with a longitudinal recess or coupling-socket 29.

The female-member 16 includes a semicylindrical body-portion 30 complementing the body-portion 17 of the male-member 15 and provided with a neck-portion 31 complementing the neck-portion 18 before referred to.

The end of the body-portion 30 remote from its neck-portion 31 is beveled as at 32 to conform to and complement the bevel 19 on the male-member 15. At the junction of its body-portion 30 and its neck-portion 31, the female member 16 is shaped to provide a semiannular stop-shoulder 33 which registers with the similar stop-shoulder 20 on the male-member 15. Formed on the neck-portion 31 of the female-member 16 adjacent the stop-shoulder 33, are two (more or less) locking-lugs 34—34 which are spaced from the said stop-shoulder to provide a semiannular channel 35. When the two members 15 and 16 are assembled (Fig. 8), the locking-lugs 34—34 are adapted to form, in conjunction with the locking-lugs 21—21 of the male-member 15, an annular series of equidistantly-spaced locking-lugs.

The outer end of the neck-portion 31 is made flat to provide a tool-receiving flat or surface 36 which extends in parallelism with and complements the tool-receiving surface 23 of the male-member 15 when the two members are assembled together. Save for the tool-receiving surfaces 36, the outer end of the neck-portion 31 like the neck-portion 18 is tapered or beveled to facilitate the entry of the part into an aperture in a manner as will hereinafter appear.

Extending longitudinally through the neck-portion 31 of the female-member 16 is a relatively-wide wire-receiving trunk-channel 37 complementing the similar wire-receiving channel 24 in the male-member 15 and similarly having extending transversely across it a wire-gripping rib or anchor 38. Intersecting the wire-receiving channel 37 and the opposite end of the body-portion 30, are two wire-receiving branch-channels 39—39 respectively located on opposite sides of the coupling-socket 29 and adapted to register with the similar wire-receiving branch-channels 27—27 in the male-member 15. Extending transversely across each of the channels 39—39 in position to complement the wire-gripping ribs 28—28 of the male-member 15, is one of two similar wire-gripping ribs or anchors 40—40, as is especially well shown in Fig. 10.

The coupling-rib 26 of the male-member 15 is sufficiently wider than the width of the coupling-socket 29 in the female-member 16 to require force in order to be fitted thereinto. In the case of nylon, for instance, it has been found that a very satisfactory force fit takes place when the coupling-rib 26 is approximately .010 inch wider than the width of the coupling-socket 29.

The locking-lugs 21—21 of the male-member 15 and the locking-lugs 34—34 of the female-member 16 are preferably so proportioned in peripheral extent as to leave clearance-gaps 41 between them, as is especially well shown in Figs. 2 and 8.

The assembly comprising the male-member 15 and female-member 16 may be mounted in any suitable case, partition, panel or the like such as, for instance, the plate-like casing 42 of an electric device. The said casing is formed with an aperture 43 which is circular in outline save for four inwardly-extending locking-lugs 44 projecting radially inwardly from the boundary of the said aperture and equally spaced from each other in a circumferential direction. The respective circumferential extends of the locking-lugs 44 are slightly less than the respective circumferential extents of the clearance-gaps 41 between the locking-lugs 21—21 of the male-member 15 and the similar locking-lugs 34—34 of the female-member 16. As thus arranged, the locking-lugs 44 are spaced from each other by clearance-gaps 45 each of which has a circumferential extent slightly exceeding the similar extent of the locking-lugs 21—21 and 34—34.

In conjunction with the male-member 15 and female-member 16 a pair of wires 46—46 may be employed, each of which may consist of the usual group of stranded conductors and a coating of rubber or other resilient insulation. The said wires 46—46 may, for purposes of clarity of description, be regarded as the inner wires which extend, for instance, to the very slender terminal wires of the energizing-coil of a synchronous electric motor. A pair of outer electric wires 47—47 similar to the wires 46—46 is respectively electrically coupled to the latter by longitudinally-split compressible connecting-tubes 48—48. The said connecting-tubes are common in the art and are usually formed of spring brass or equivalent material. In the instance shown, the wires 47—47 are separably adhered to each other in a manner common in the art.

In assembling the male-member 15, female-member 16, wires 46—46 and wires 47—47, either the male-member 15 or the female-member 16 may have the connected wires 46—46 and 47—47 laid into its wire-receiving channels, in the manner apparent by reference to Fig. 4, following which, the complemental member of the fitting may be assembled by forcing the surfaces of the coupling-rib 26 and coupling-socket 29 together to thereby bring the flat diametrical inner faces of the male-member 15 and female-member 16 into engagement or juxtaposition.

When the male-member 15 and female-member 16 are brought into tight engagement, they will be held in such position by the friction between the coupling-rib 26 and coupling-socket 29 against all but deliberate separation, and one of the wires 46 and its connected wire 47 will be housed in the complementary channels (each of circular cross section) formed by one each of the opposed and registering branch-channels 27 and 39 in the respective members. The two wires 47—47 will both extend through the oval wire-receiving passage formed jointly by the registering trunk-channels 24 and 37 of the respective members 15 and 16.

When the male-member 15 and female-member 16 are tightly forced into face-to-face engagement as above described, each of the wires 46 will have its yielding insulation pinched between the opposing wire-gripping ribs 28 and 40 so as to be effectively anchored against being pulled out of the now-assembled members 15 and 16. Similarly, the companion wires 47—47 will be jointly gripped by the opposed wire-gripping ribs 25 and 38 extending transversely respectively of the passages 24 and 37.

After assembly with the wires as above described, the male-member 15 and female-member 16 may have their complemental neck-portions 18 and 31 (together with one of the pairs of wires) inserted through the aperture 43 in the casing 42 or its equivalent, by registering the clearance-gaps 41 between the locking-lugs 21—21 and 34—34 with the locking-lugs 44 of the casing 42. After the parts have been assembled as just above described and as indicated in Figs. 1 to 7 inclusive, the assembled members may be rotated about 45° to thereby cause the locking-lugs 21—21 and 34—34 to assume positions back of the locking-lugs 44 of the casing 42. Under the conditions just described, the locking-lugs 44 will be accommodated in the substantially-annular channel provided by the registering semiannular channels 22 and 35 respectively of the male-member 15 and female-member 16.

The joint turning of the male-member 15 and female-member 16 in order to effect its interlocking in the aperture 43 of the casing 42 may be effected by means of a wrench or other suitable tool engaging coincidently with the respective parallel tool-receiving flats or surfaces 23 and 36. The reverse turning movement of the assembled members 15 and 16 may be similarly effected when it is desired to remove the assembly from the casing 42 or its equivalent. After removal, the members 15 and 16 may be pried apart to facilitate the repair or replacement of the wires 46—46 and 47—47.

When the male-member 15 and female-member 16 are assembled together and installed as above described, both sets of wires 46—46 and 47—47 will be firmly gripped against slipping with respect to the assembly and thus avoid lengthwise displacement of the said wires and the application of strain to delicate connections such, for instance, as those of the energizing-coil of the synchronous electric motor.

*The showing of Fig. 12*

In Fig. 12, the showing is similar to Fig. 4, save that the wires 46—46 and 47—47 are merely soldered together and the connecting-tubes 48—48 are omitted.

After the wires above referred to have been partially twisted together and supplied with both flux and powdered solder, the male-member 15 and the female-member 16 may be assembled with the said wires without heating the said solder and flux. After assembly, as just referred to, the said assembly may be momentarily placed in a high-frequency induction field to effect the melting of the powdered solder and the firm mechanical and electrical union of the wires 46—46 and 47—47.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

We claim:

1. A bushing for supporting electrical conductors comprising: a male-member having a Y-shaped conductor-channel extending therethrough; a female-member having a Y-shaped conductor-channel extending therethrough constructed and arranged to complement the Y-shaped conductor-channel of said male-member; conductor-anchoring means in said channels arranged to grip said conductors when said male- and female-members are secured in complemental relation; fastening-means to secure said male-member in complemental relation to said female-member comprising a rib projecting from said male-member intermediate the two separate branches of its Y-shaped conductor-channel, said projecting rib being arranged to fit snugly and friction-tight in a recess formed in said female-member intermediate the two separated branches of its Y-shaped conductor-channel; and means to secure said bushing on a support comprising projections formed circumferentially on one end of the said complemental male- and female-members arranged to lock with said support.

2. A bushing for supporting electrical conductors comprising: a male-member having a Y-shaped conductor-channel extending therethrough; a female-member having a Y-shaped conductor-channel extending therethrough constructed and arranged to complement the Y-shaped conductor-channel of said male-member; conductor-anchoring means in said channels arranged to grip said conductors when said male- and female-members are secured in complemental relation; fastening-means to secure said male-member in complemental relation to said female-member comprising a rib projecting from said male-member intermediate the two separated branches of its Y-shaped conductor-channel, said projecting rib being arranged to fit snugly and friction-tight in a recess formed in said female-member intermediate the two separated branches of its Y-shaped conductor-channel; and means to secure said bushing on a support comprising an integral neck-portion on said male-member, an integral neck-portion on said female-member constructed and arranged to complement the neck-portion of said male-member, and projections on the complemental neck portions of said male- and female-members arranged to lock with said support.

3. A substantially-cylindrical bushing for supporting electrical conductors comprising: a solid substantially-semicylindrical male-member having a flat face and a Y-shaped conductor-channel extending longitudinally thereof; a solid substantially-semicylindrical female-member having a flat face and a Y-shaped conductor-channel extending longitudinally thereof and arranged to complement the longtudinal Y-shaped conductor-channel in the flat face of said male-member; conductor-anchoring means comprising transverse ribs in said channels arranged to grip said conductors when said male- and female-members are secured in complemental relation; fastening-means to secure said male-member in complemental relationship to said female-member with the flat faces of said respective members in mutual engagement, said fastening-means comprising a rib projecting from the flat face of said male-member and arranged to fit snugly and friction-tight in a recess in the flat face of said female-member; and means to secure said bushing on a support comprising an integral semicylindrical neck-portion on said male-member, an integral semicylindrical neck-portion on said female-member constructed and arranged to complement the semicylindrical neck-portion of said male-member, and lugs projecting radially from the complemental neck-portions of said male- and female-members arranged to lock with said support.

4. A substantially-cylindrical bushing for supporting electrical conductors comprising: a male-member having a solid semicylindrical body provided with a reduced neck-portion and a flat face; a conductor-channel in said flat face comprising a longitudinal trunk-channel coaxial with the longitudinal axis of said flat face and intersecting one end thereof and a pair of spaced-parallel branch-channels extending longitudinally of said flat face, the inner ends of said branch-channels converging inwardly and intersecting the inner end of said trunk-channel and the outer ends of said branch-channels intersecting the opposite end of said flat face; a female-member having a solid semicylindrical body provided with a reduced neck-portion and a flat face; a conductor-channel therein comprising a trunk-channel and branch-channels constructed and arranged to complement the corresponding trunk-channel and branch-channels of said male-member; conductor - anchoring means comprising transverse ribs in said channels arranged to grip said conductors when said male- and female-members are secured in complemental relation; fastening-means to secure said male-member in complemental relationship to said female-member with the flat faces of said respective members in mutual engagement, said fastening-means comprising a rib projecting from the flat face of said male-member and extending longitudinally thereof intermediate the said spaced-parallel branch-channels of its conductor-channel, said rib being arranged to fit snugly and friction-tight in a longitudinal recess in the flat face of said female-member intermediate the spaced-parallel branch-channels of its conductor-channel; and means to secure said bushing to a support coomprising projections formed circumferentially on the complemental neck-portions of said male- and female-members arranged to lock with said support.

5. A substantially-cylindrical bushing for supporting electrical conductors comprising: a male-member having a solid semicylindrical body provided with a reduced neck-portion and a flat face; a conductor-channel in said flat face comprising a longitudinal trunk-channel coaxial with the longitudinal axis of said flat face and intersecting one end thereof and a pair of spaced parallel branch-channels extending longitudinally of said flat face, the inner ends of said branch-channels converging inwardly and intersecting the inner end of said trunk-channel and the outer ends of said branch-channels intersecting the opposite end of said flat face; a female-member having a solid semicylindrical body provided with a reduced neck-portion and a flat face; a conductor-channel therein comprising a trunk-channel and branch-channels constructed and arranged to complement the corresponding trunk-channel and branch-channels of said male-member; transverse anchoring-ribs in the trunk-channel and branch-channels of said male-member and transverse anchoring-ribs in the corresponding channels of said female-member arranged to complement the transverse anchoring-ribs of said male-member to grip said conductors therebetween when said members are secured in complemental relation; fastening-means to secure said male-member in complemental relationship to said female-member with the flat faces of said respective members in mutual engagement, said fastening-means comprising a rib projecting from the flat face of said male-member and extending longitudinally thereof intermediate the spaced-parallel branch-channels of its conductor-channel, said longitudinal rib being arranged to fit snugly and friction-tight in a longitudinal recess in the flat face of said female-member intermediate the spaced-parallel branch-channels of its conductor-channel; and means to secure said bushing to a support comprising lugs projecting radially from the complemental neck-portions of said male- and female-members arranged to lock with said support.

6. In an electrical device, the combination with supporting-means having an aperture therein; of a substantially-cylindrical bushing for holding electrical conductors, said bushing comprising a solid substantially-semicylindrical male-member having a flat surface provided with a shouldered neck-portion and a Y-shaped conductor-channel therein; a solid substantially-semicylindrical female-member having a flat surface provided with a shouldered neck-portion and a Y-shaped conductor-channel therein constructed and arranged to complement the Y-shaped conductor-channel of said male-member; electrical conductors mounted in the Y-shaped channel of one of said members; conductor-anchoring means comprising transverse ribs in said channels arranged to grip said conductors when said male- and female-members are secured in complemental relation; fastening-means to secure said male- and female-members in complemental relation, said fastening-means comprising a rib projecting from said male-member intermediate the two separated branches of its Y-shaped conductor-channel, said projecting rib being arranged to fit snugly and friction-tight in a recess formed in said female-member intermediate the two separated branches of its Y-shaped conductor-channel; and means to secure said bushing in the aperture of said supporting-means comprising the complemental neck-portions of said male- and female-members arranged to project through the aperture of said supporting-means and to engage their circumferential shoulders against one face thereof and radially-projecting lugs on the complemental neck-portions of said members arranged to project through said aperture and to lock with the boundary thereof on the opposite side of said supporting-means.

7. In an electrical device, the combination with supporting-means having an aperture therein; of substantially-cylindrical bushing for holding electrical conductors, said bushing comprising a solid substantially-semicylindrical male-member having a flat surface provided with a shouldered neck-portion and a Y-shaped conductor-channel therein; a solid substantially-semicylindrical female-member having a flat surface provided with a shouldered neck-portion and a Y-shaped conductor-channel therein constructed and arranged to complement the Y-shaped conductor-channel of said male-member; electrical conductors mounted in the Y-shaped channel of one of said members; conductor-anchoring means comprising transverse ribs in said channels arranged to grip said conductors when said male- and female-members are secured in complemental relation; fastening-means to secure said male- and female-member in complemental relation, said fastening-means comprising a rib projecting from said male-member intermediate the two separated branches of its Y-shaped conductor-channel, said projecting rib being arranged to fit snugly and friction-tight in a recess formed in said female-member intermediate the two separated branches of its Y-shaped conductor-channel; means to secure said bushing in the aperture of said supporting-means comprising the complemental neck-portions of said male- and female-members arranged to project through the aperture of said supporting-means and to engage their circumferential shoulders against one face thereof and radially-projecting lugs on the complemental neck-portions of said members arranged to project through said aperture and to lock with the boundary thereof on the opposite side of said supporting-means; and transverse tool-engaging flats on the outer end of the said complemental neck-portion of said bushing for turning said bushing in said aperture to lock and unlock said lugs with the boundary thereof.

8. A bushing for supporting electrical conductors comprising: a male-member having a Y-shaped conductor-channel extending therethrough; a female-member having a Y-shaped conductor-channel extending therethrough constructed and arranged to complement the Y-shaped conductor-channel of said male-member; conductor-anchoring means in said channels and arranged to grip said conductors when the said male- and female-members are secured in complemental relation; fastening-means to secure said male-member in complemental relation to said female-member comprising a rib projecting from said male-member intermediate the two separate branches of its Y-shaped conductor-channel, said projecting rib being arranged to fit snugly and friction-tight in a recess formed in said female-member intermediate the two separated branches of its Y-shaped conductor-channel; and means arranged on the bushing and effective to lockingly secure it to a support.

9. A bushing for supporting electrical conductors, comprising: a male-member having a pair of branch conductor-channels and a relatively-wide trunk-channel merging with said branch-channels; a female-member having a pair of branch conductor-channels and a relatively-wide trunk-channel merging with said branch-channels, said last-mentioned conductor-channels and a trunk-channel being constructed and arranged to complement the branch-channels and trunk-channel of said male-member; conductor-anchoring means in said channels and arranged to grip said conductors when the said male- and female-members are secured in complemental relation; fastening-means to secure said male-member in complemental relation to said female-member and comprising a rib projecting from said male-member intermediate the pair of branch conductor-channels therein; said projecting rib being arranged to fit snugly and friction-tight in a recess formed in the female-member intermediate the pair of branch conductor-channels in said female-member, and means arranged on the bushing and effective to lockingly secure said bushing to a support.

WILLIAM K. SESSIONS, JR.
EARL D. BRIGHTMAN.

REFERENCES CITED

The following references are of record in the file of this patent:

UNITED STATES PATENTS

| Number | Name | Date |
| --- | --- | --- |
| 1,025,774 | Young et al. | May 7, 1912 |
| 1,383,764 | Sargent | July 5, 1921 |
| 1,629,086 | Wohl et al. | May 17, 1927 |
| 1,659,447 | Smith | Feb. 14, 1928 |
| 1,683,904 | Knoblock | Sept. 11, 1928 |
| 2,277,637 | Eby | Mar. 27, 1942 |

FOREIGN PATENTS

| Number | Country | Date |
| --- | --- | --- |
| 175,565 | Great Britain | Feb. 23, 1922 |